E. HALE, Jr.
SEAT GUARD FOR HARVESTER.
No. 170,554. Patented Nov. 30, 1875.
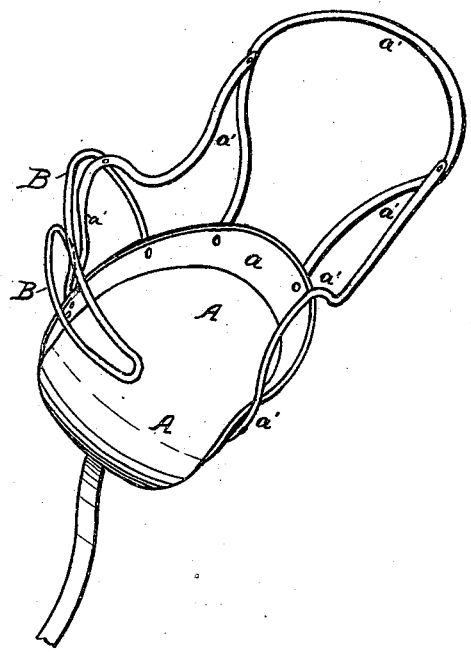

UNITED STATES PATENT OFFICE.

EDWARD HALE, JR., OF CHICAGO, ASSIGNOR, BY MESNE ASSIGNMENTS, TO JOHN H. SHAY AND JOHN E. PUTNAM, OF BEARDSTOWN, ILL.

IMPROVEMENT IN SEAT-GUARDS FOR HARVESTERS.

Specification forming part of Letters Patent No. 170,554, dated November 30, 1875; application filed August 12, 1875.

*To all whom it may concern:*

Be it known that I, EDWARD HALE, Jr., of Chicago, in the county of Cook and State of Illinois, have invented a new, useful, and Improved Guard for Reapers and Mowers, and similar machines or vehicles, of which improvement the following is a full, clear, and exact description, which will enable others skilled in the art to which my invention appertains to make and use the said improvement, reference being had to the accompanying drawing, forming a part hereof, and in which the figure shown is a perspective view of my improved guard applied to the driver's seat of the class of machines or vehicles herein referred to.

Accidents resulting in severe bodily injury and loss of life frequently happen to the drivers of reapers and mowers, and of similar machines or vehicles. In this class of machines or vehicles the driver's seat is necessarily elevated considerably above the frame, and is, therefore, greatly swayed by the movement of the machine over uneven ground. For this reason the driver is liable to be thrown upon the knives while the latter are in action, especially if he loses control of the team, or meets with unexpected obstacles.

The object of my invention is to prevent accidents of this kind; and to that end my invention consists of a guard arranged partly in front of the driver's seat, in such a manner as to prevent him from being accidentally thrown therefrom upon the knives, but so that he may enter and leave his seat with facility, substantially as hereinafter described.

In the drawing, A represents the driver's seat usually employed in connection with reapers and mowers, and machines or vehicles of that class. The seat may be made and applied in the usual manner. In the example shown the sides and rear of the seat are flanged, as shown at *a*, and to this flange is attached the frame *a'*, constituting the back and arms of the seat.

The parts *a* and *a'*, however, are not essential to my invention; but I deem it preferable either to employ them in connection therewith, or to use some other equivalent protection, arranged behind and at the sides of the seat. The part *a*, if sufficiently extended, will form such a protection.

B is the guard, to which I have referred as constituting the chief feature of my invention. This guard is arranged above and in front of the seat, as shown, and extends from one side thereof toward the other, leaving sufficient room at the free end of the guard to enable the driver to enter and leave his seat with convenience.

When the knives extend from the right-hand side of the machine or vehicle, the guard should extend in the opposite direction, and vice versa.

By this means the driver is allowed full freedom while in his seat, and may even stand erect on the frame of the machine or vehicle without losing the protection afforded by the guard. With this protection it will be almost impossible for him to fall or be thrown from his seat; but in no event can he fall upon the knives.

Although I have here shown the guard-arm B as attached to the seat, I do not intend to limit myself to the arm when attached thereto, for it may be attached with advantage to the frame of the machine or vehicle, the chief object being to arrange the arm substantially as described with relation to seat.

Having thus described my invention, what I claim as new, and desire to secure by Letters Patent, is—

The guard-arm B, arranged substantially as shown and described with relation to the driver's seat A, for the purposes set forth.

EDWARD HALE, JR.

Witnesses:
J. H. SHAY,
F. F. WARNER.